United States Patent [19]
Thring

[11] Patent Number: 5,836,289
[45] Date of Patent: Nov. 17, 1998

[54] POROUS ELEMENT FUEL VAPORIZER

[75] Inventor: Robert H. Thring, Devine, Tex.

[73] Assignee: Southwest Research Institute, San Antonio, Tex.

[21] Appl. No.: 872,252

[22] Filed: Jun. 10, 1997

[51] Int. Cl.$^6$ .................................................. F02M 31/00
[52] U.S. Cl. ............................................................. 123/549
[58] Field of Search .................................. 123/549, 557, 123/545, 546, 547

[56] References Cited

U.S. PATENT DOCUMENTS

| | | | |
|---|---|---|---|
| 990,249 | 4/1911 | Garcia et al. . | |
| 1,147,416 | 7/1915 | MacDonald . | |
| 1,880,306 | 10/1932 | Wulff . | |
| 1,931,875 | 10/1933 | Oppenheim . | |
| 4,108,953 | 8/1978 | Rocco | 123/549 |
| 4,141,327 | 2/1979 | Marcoux et al. | 123/549 |
| 4,325,341 | 4/1982 | Yamauchi et al. | 123/549 |
| 4,345,569 | 8/1982 | Hattori et al. | 123/549 |
| 4,447,706 | 5/1984 | Eder et al. . | |
| 4,543,921 | 10/1985 | Torigai et al. . | |
| 4,572,146 | 2/1986 | Grunwald et al. . | |
| 4,627,405 | 12/1986 | Imhof et al. | 123/549 |
| 5,038,742 | 8/1991 | Uddin . | |

*Primary Examiner*—Marguerite McMahon
*Attorney, Agent, or Firm*—Robert C. Curfiss; Bracewell & Patterson

[57] ABSTRACT

A porous element fuel vaporizer to be used in conjunction with internal combustion engines. The vaporizer, comprising a fuel injector in conjunction with a porous element, wherein during cold operations the porous element heats and vaporizes the fuel exiting the fuel injector. Since during cold operations an engine consumes more fuel to compensate for liquid fuel precipitating inside, an important feature of this combination involves eliminating precipitate during cold starts to reduce fuel consumption and decrease engine emissions.

9 Claims, 1 Drawing Sheet

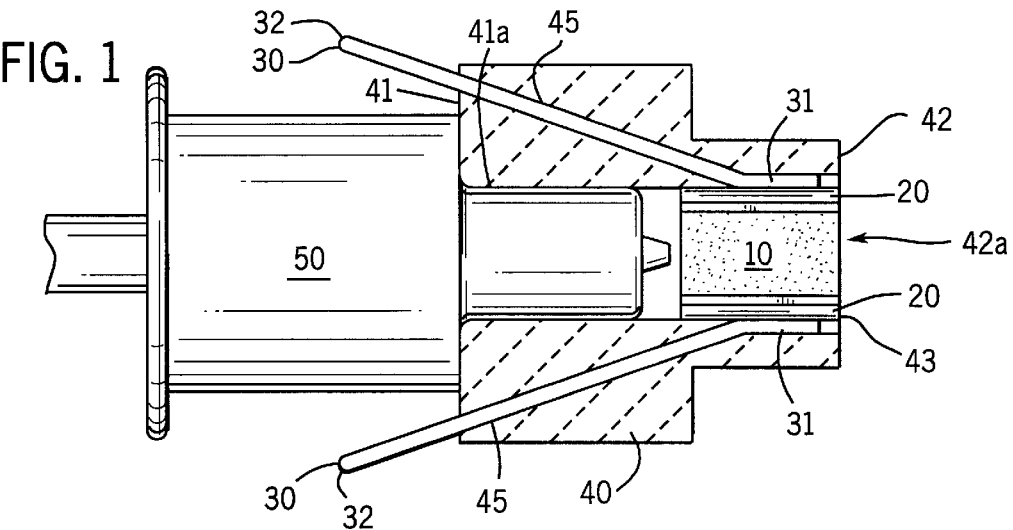
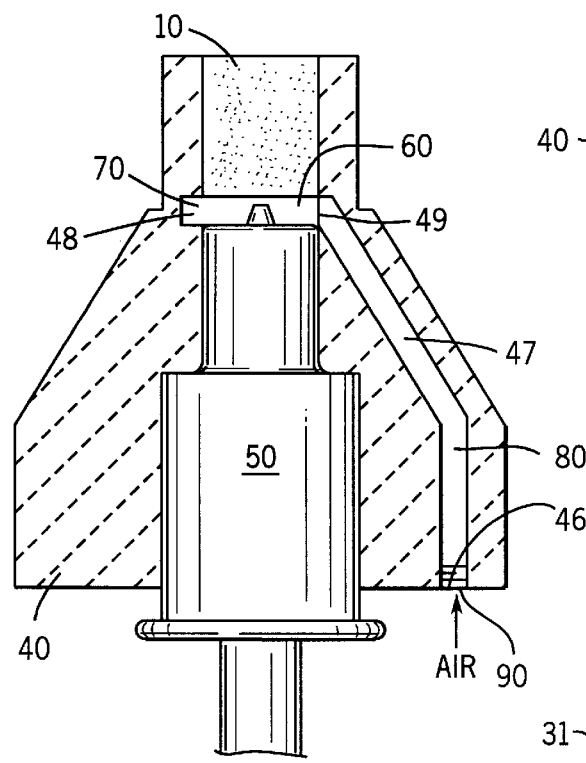
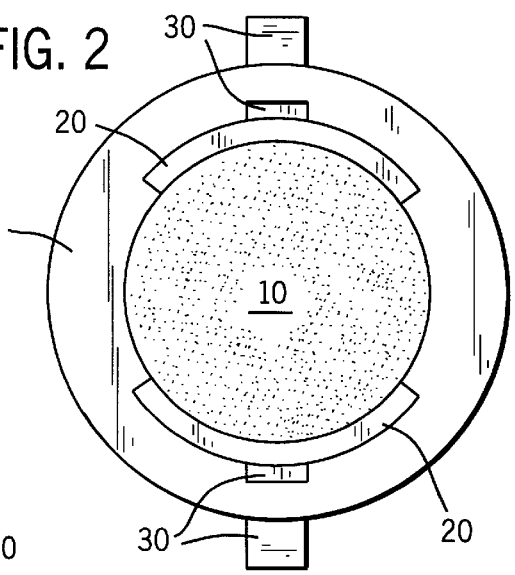
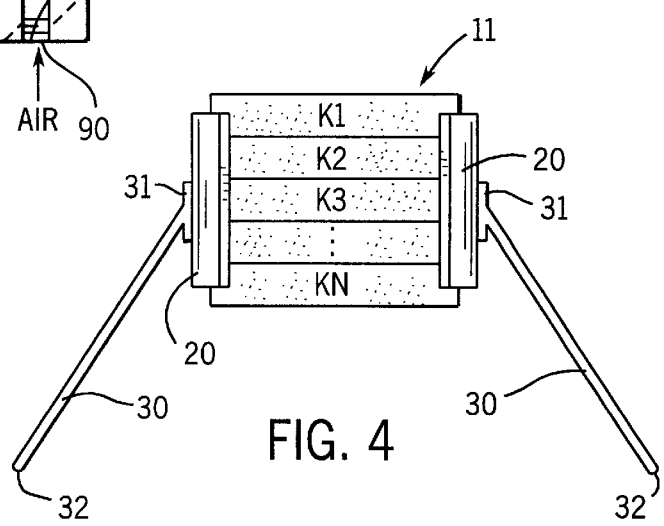

POROUS ELEMENT FUEL VAPORIZER

BACKGROUND OF INVENTION

1. Field of Invention

The subject invention is generally related to an internal combustion engine having a fuel injection system, and specifically directed to an element that heats and vaporizes the fuel provided by the fuel injection system.

2. Description of the Prior Art

During the Federal Test Procedure as much as 80 percent of the total hydrocarbon emissions produced by a typical modern passenger car occur during the first 120 seconds of the test. This is a generally accepted fact among automotive emission engineers. This occurs because after 120 seconds the catalyst in the catalytic converter becomes active and drastically reduces the hydrocarbon emissions for the remainder of the test. Before that time the catalyst is still cold, and oxidizes little of the hydrocarbon emissions. Additionally, the engine operates in open-loop mode, and runs richer than stoichiometric, so the hydrocarbon emissions are higher than during warmed up operation.

One reason why the engine runs richer than stoichiometric during cold operation is that liquid fuel attaches to the walls of the intake system and combustion chamber, where it cannot be easily ignited or burned. Extra fuel is added to the engine to compensate. If the engine was started using gasoline vapor instead of liquid gasoline, cold-start enrichment could be eliminated. This is illustrated by engines operating on 100 percent natural gas not needing cold-start enrichment. Vapor for cold starts could be drawn from the vapor space in the fuel tank. However, metering fuel vapor is problematic, so it is preferable to meter the fuel as a liquid then vaporize it. To do this and still obtain good transient response from the vehicle, it is necessary to have a quickly responding fuel vaporizer. Such a fuel vaporizer can be made from a porous element.

SUMMARY OF THE INVENTION

The subject invention is directed to a porous element fuel vaporizer that substantially reduces emissions problems associated with cold engines. Emissions reduction during cold starts is accomplished by introducing heated vaporized fuel into the combustion chamber rather than liquid fuel, thus combusting more of the fuel. During cold starts the Porous Element Fuel Vaporizer utilizes a heated porous element affixed downstream of the spray nozzle of a fuel injector. After exiting the spray nozzle the liquid fuel contacts the heated porous element and vaporizes by virtue of the heating and pressure drop across the porous element.

A holder is used to affix the fuel injector upstream of the porous element. It has a first inlet for attaching to the fuel injector, and a second inlet for the porous element. A fuel air mixing chamber is located inside the holder, between the fuel injector and the porous element. The chamber enhances the mixing of the fuel and air to improve engine efficiency and reduce engine emissions. Air is injected to the mixing chamber via a port formed through the holder body. The port is formed axially through the holder from its upstream side, then radially into the air manifold. The air manifold comprises the radial space around the fuel mixing chamber. The manifold is configured to augment more uniform air distribution into the mixing chamber; thus maximizing fuel and air mixing. To withstand the high temperature environment, the holder material could be made of a heat resisting non-electrically conducting material such as the alumina ceramic used for making automotive spark plugs.

Electrical current is employed to heat the porous element through attached electrodes and metallic conductors. The conductors are attached on one end to an electrical current source, and on the other to electrodes that have been bonded onto the porous element.

In the preferred embodiment a control system is added to regulate the amount of electrical current provided to the porous element. The control system is calibrated to furnish appropriate current relative to the flow of fuel through the fuel injector. If the amount of current is constant, total vaporization will not occur with high fuel flows. Additionally, during low fuel flows overheating of the fuel could result in pyrolysis.

In the preferred embodiment, the porous element is electrically conducting, cylindrical and sufficiently porous to allow liquid flow and vapor flow. However, the porous element should provide enough pressure drop to ensure that the fuel vaporizes. Additionally, the porous element is located axially downstream of the fuel injector.

In an alternative embodiment, the porous element is comprised of a multiplicity of disks. Wherein each disk has a different coefficient of conductivity.

Another object of the invention is to enhance internal combustion engine efficiency by combusting more of the fuel consumed. Thus reducing overall emissions by eliminating unburned fuel exhaust and combustion products produced compensating for unburned fuel.

Other objects and features will be readily apparent from the accompanying drawings and description.

BRIEF DESCRIPTION OF THE DRAWINGS

FIG. 1 is a side cross-sectional view of the Porous Element Fuel Vaporizer combined with a fuel injector. The combination is joined with a holder. Further, the metallic electrodes and metallic conductors are shown bonded to the porous element.

FIG. 2 is a frontal cross-sectional view of the Porous Element Fuel Vaporizer; elucidating the intimate connection of the metallic electrodes and conductors with the porous element.

FIG. 3 is an overhead cross-sectional view of the Porous Element Fuel Vaporizer, depicting the fuel/air mixing system.

FIG. 4 is an alternative embodiment of the porous element.

DETAILED DESCRIPTION OF THE DRAWINGS

Referring to FIG. 1, the porous element is designated by the numeral 10, the fuel injector by 50, the holder by 40, the metallic electrodes by 20 and the metallic conductors by 30. The porous element 10, is cylindrical, and positioned axially downstream of the fuel injector 50. The porous element 10 and fuel injector 50 are securely fastened in place by use of a holder 40. The holder 40 has two openings, the upstream opening 41a, formed on the upstream face 41 of the holder 40, and fabricated to accept the fuel injector 50. The holder's 40 downstream opening 42a is formed on the downstream face 42 and constructed to accept and retain the porous element 10. The porous element 10 can be retained in the holder 40 by being press fit, chemically bonded, with industrial fasteners or by adding a radial lip 43 on the interior of the downstream opening 42. The fuel injector 50 can be press fit into the holder 40, retained by associated threads machined on the fuel injector 50 and holder 40, clamped to the holder 40, bolted directly to the holder 40, or some other appropriate fastening means.

As shown in FIG. 2 the metallic electrodes 20, are bonded to the outer radial periphery of the porous element 10. The electrodes 20, are electrically conducting metallic coupons, formed to be radially planer, with an inner radius equal to the radius of the porous element 10. Connected to each electrode's 20 convex surface is a metallic conductor 30. The conductors 30 are comprised of a metallic electrically conducting material and have lengths that are substantially greater than their cross-sectional distances. The cross-section can be rectangular, circular or any other suitable configuration. The conductors 30 are bonded to the electrodes 20 on one end 31, and to an electrical source on the other end 32. The conductors 30 protrude through apertures 45 formed in the holder 40 and conduct electrical current from an electrical source to the electrodes 20.

FIG. 3 illustrates that in addition to the apertures 45, an air inlet 46, air passage 47, a fuel/air mixing chamber 48, and an air manifold 49 are formed in the holder 40. The air inlet 46, is formed on the holder 40 upstream face 41 radially outward from the upstream opening 41a. Connected to the air inlet 46 is the air passage 47 which is a bore formed axially from the air inlet 46, then radially inward to the fuel/air mixing chamber 48. The fuel/air mixing chamber 48 is substantially cylindrical, wherein the lateral surfaces are defined by inner radius of the fuel injector and porous element; and the outer radius is defined by the air manifold 49. The air manifold 49 radially encompasses the fuel/air mixing chamber 49, and is defined by a radial groove on the inside surface of the holder 40.

An alternative embodiment of the porous element is depicted in FIG. 4. There the electrical conductivity of the porous element is non-uniform to produce different amounts of current flowing across the element at different axial locations. Since the current flow determines the element temperature this configuration produces an axial thermal gradient along the element. Therefore the user can design the amount of desired heating along the element to enhance vaporization. The thermal gradient along the element can be accomplished by using multiple "biscuits" 11 laminated into a single porous element. The electrical conductivity of each biscuit 11 being different.

In use, the fuel injector 50 operates normally except when cold enrichment is needed. Then metered fuel passes from the fuel injector 50 into the fuel/air mixing chamber 48. While in the chamber 48 the fuel is mixed with air hat has been introduced through the air passage 47. An air manifold 49 is provided around the mixing chamber to promote the mixing process and produce a more uniform mixture. The mixture then passes through the heated porous element 10 where the fuel is fully vaporized before passing into the engine. It is vital that the appropriate amount of current be delivered to the porous element 10 during operation, this amount is determined by the volume of fuel flowing through the fuel injector 50. If insufficient current is delivered to the porous element 10 some of the fuel may not vaporize; while too much current could result in fuel pyrolysis. Insufficient vaporization increases emissions, whereas the pyrolysis caused by excessive heating could cause blocking of the element. To avoid overheating or undervaporization, the current flow to the element is varied relative to the fuel flow. This operation is accomplished with a control system that measures the fuel flow and correspondingly delivers the correct amount of current for the measured volume of fuel.

Since porous elements heat up quickly, little time delay will exist from when the ignition is activated to when full fuel vaporization will occur. With fully vaporized fuel, it should be possible to cold start passenger cars with little or no enrichment resulting in a substantial reduction in hydrocarbon emissions in the first 120 seconds of the Federal Test Procedure.

Therefore, it is an object and feature of the subject invention to provide a Porous Element Fuel Vaporizer to vaporize gasoline at the injector in an internal combustion engine to reduce hydrocarbon emissions and improve cold-starts.

While specific embodiments and features of the invention have been disclosed herein, it will be readily understood that the invention encompasses all enhancements and modifications within the scope and spirit of the following claims:

What is claimed is:

1. An apparatus for heating and vaporizing fuel spray released from the spray nozzle of a fuel injector comprising:

a porous element situated downstream of said fuel injector for receiving, heating and vaporizing fuel spray from said feel injector;

a device for heating said porous element;

a holder having a first receptive end for permanently axially positioning said porous element and a second receptive end for permanently axially positioning said spray nozzle upstream of said porous element and having;

a cylindrical fuel air mixing chamber in an open space in said holder between said porous element and said spray nozzle:

a circumferential air manifold radially circumscribing said mixing chamber; and an air inlet for supplying air radially into said manifold and said mixing chamber, wherein said holder is heat resistant and is constructed of a non-electrically conductive material.

2. The apparatus of claim 1, wherein said porous element is electrically conducting.

3. The apparatus of claim 1, wherein said porous element is cylindrical.

4. The apparatus of claim 1, wherein said porous element is sufficiently porous to vaporize liquid fuel axially flowing through said element.

5. The apparatus of claim 1, wherein said porous element can accommodate axial liquid and vapor flow.

6. The apparatus of claim 1, wherein said porous element is located axially downstream of said fuel injector.

7. The apparatus of claim 1, having a control system regulating electrical current flow to said porous element.

8. The apparatus of claim 1, wherein said means for providing electrical current comprises:

electrodes bonded to said porous element; metallic conductors having a first and second end, whereby each said first end is connected to each said electrode, and said second end has appropriate endings for connecting to an electrical source.

9. The porous element of claim 1, wherein said porous element is comprised of a multiplicity of disks having different coefficients of conductivity.

\* \* \* \* \*